United States Patent
Jain et al.

(10) Patent No.: US 9,809,141 B2
(45) Date of Patent: Nov. 7, 2017

(54) STORAGE COMPARTMENT COMPRISING A FOLDABLE HOLDER ELEMENT

(71) Applicant: FAURECIA INTERIOR SYSTEMS INDIA PVT. LTD., Pune, Maharashtra State (IN)

(72) Inventors: Chetan Jain, Waked Pune (IN); Atul Aglawe, Dhanori Pune (IN)

(73) Assignee: Faurecia Interior Systems India PVT. Ltd., Bhosari, Pune, Maharashtra State (IN)

( * ) Notice: Subject to any disclaimer, the term of this patent is extended or adjusted under 35 U.S.C. 154(b) by 0 days.

(21) Appl. No.: 15/293,130

(22) Filed: Oct. 13, 2016

(65) Prior Publication Data
US 2017/0101044 A1    Apr. 13, 2017

(30) Foreign Application Priority Data
Oct. 13, 2015   (IN) .......................... 3872/MUM/2015

(51) Int. Cl.
*B60N 3/10*     (2006.01)
*B60R 7/04*     (2006.01)

(52) U.S. Cl.
CPC ............. *B60N 3/102* (2013.01); *B60N 3/108* (2013.01); *B60R 7/04* (2013.01)

(58) Field of Classification Search
CPC ........ B60N 3/102; B60N 3/105; B60N 3/108; B60R 7/04

USPC ........... 296/24.34, 37.8; 224/282, 324, 926; 248/311, 3, 315
See application file for complete search history.

(56) References Cited

U.S. PATENT DOCUMENTS

| | | | | | |
|---|---|---|---|---|---|
| 1,753,357 | A | * | 4/1930 | Wood | A47F 1/085 221/46 |
| 5,505,417 | A | * | 4/1996 | Plocher | B60N 3/102 224/926 |
| 5,845,888 | A | * | 12/1998 | Anderson | B60N 2/468 224/926 |
| 6,036,152 | A | * | 3/2000 | Hiscox | B60N 3/102 224/281 |
| 7,611,115 | B2 | * | 11/2009 | Kniazyszcze | B60N 3/102 224/926 |

* cited by examiner

*Primary Examiner* — Dennis H Pedder
(74) *Attorney, Agent, or Firm* — Reising Ethington P.C.

(57) ABSTRACT

A storage compartment has a storage volume delimited by a first wall and a second wall extending opposite the first wall. The first wall has a recess opening towards the storage volume. The storage compartment includes a locking element and a holder element having a frame that delimits an opening for the reception of an object. The holder element is movable in rotation between a retracted position, wherein the frame extends in the recess of the first wall, and a deployed position, wherein the frame extends in the storage volume and the locking element cooperates with a locking surface of the second wall such that the opening of the holder element extends across the storage volume.

11 Claims, 2 Drawing Sheets

STORAGE COMPARTMENT COMPRISING A FOLDABLE HOLDER ELEMENT

TECHNICAL FIELD

The present invention relates to a storage compartment for a vehicle of the type comprising a storage volume delimited by at least a first wall and a second wall extending opposite the first wall, said first wall comprising a recess opening towards the storage volume, the storage compartment comprising a holder element comprising a frame, delimiting an opening for the reception of an object to be held by the holder element, and a locking element, said holder element being articulated on the first wall.

BACKGROUND

It is known to provide the interior of a vehicle with one or more holder elements such as cup holders to allow the users of the vehicle to safely store their beverages without the risk of spilling liquid in the vehicle.

Such holder elements are preferably retractable such that they do not occupy space in the compartment of the vehicle when they are not used. However, even in the retracted position, part of the holder element remain visible to the users, for example a front flap or another actuation element which has to be accessible to move the holder element to its deployed position. Such a visible part can be detrimental to the aspect of the interior of the vehicle.

Furthermore, the holder elements generally occupy an important space in the retracted position. For example, holder elements which can be moved as drawers between the retracted and deployed positions require a large space to store the holder elements in the retracted position. This space is therefore lost to other elements of the interior of a vehicle.

SUMMARY

One of the aims of the invention is to solve the above mentioned problems by proposing a storage compartment which can accommodate a holder element, which is nearly invisible to the users of a vehicle and which does not occupy an important space when it is placed in a retracted position.

To this end, the invention relates to a storage compartment of the afore-mentioned type, wherein the holder element is movable in rotation between a retracted position, wherein the frame extends in the recess of the first wall and does not extend in the storage volume, and a deployed position, wherein the frame extends in the storage volume and the locking element cooperates with a locking surface of the second wall such that the opening of the holder element extends across the storage volume.

The holder element is hidden in the recess of the first wall in the retracted position, meaning that the holder element extends in a part of the vehicle which is almost not visible to the users of the vehicle when it is in the retracted position. Furthermore, in the retracted position, the holder element occupies a space, along and beside the storage volume, which is not significant and which is usually not employed for placing other elements of the vehicle.

According to other features of the storage compartment of the invention:

the locking element cooperates with a locking surface of the recess such that the holder element is maintained in the recess in the retracted position, the frame comprises a first part and a second part, said first part and second part defining together the opening, the first part being articulated on the first wall and the second part carrying the locking element, the first part and the second part being movable relative to each other between a locked position, wherein the locking element cooperates with a locking surface of the first wall or of the second wall, and an unlocked position, wherein the locking element can be disengaged from the locking surface of the first wall or of the second wall such that the holder element can move between its retracted position and its deployed position, at least one resilient element extends between the first part and the second part, said resilient element being arranged to urge the second part towards the locked position, at least one actuator surface, said actuator surface being actuable to move the second part towards the unlocked position against the force of the resilient element, at least one resilient element is arranged around the axis of rotation of the holder element to urge the holder element towards its deployed position, the holder element further comprises a support part, comprising a support surface, said support part being movable relative to the frame of the holder element between a retracted position, wherein at least a part of the support surface is applied against the frame when the holder element is in the retracted position, and a deployed position, wherein the support surface extends away from the opening such that the support surface is substantially parallel to the opening when the holder element is in the deployed position, at least one flexible membrane is attached to the frame such that said flexible membrane surrounds a part of the opening to locally reduce the diameter of said opening, in the deployed position, the opening extends in a plane substantially perpendicular to the axis of the storage volume, the locking element is formed by at least one tab protruding from the frame, the storage compartment forms a part of a central console of a vehicle.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE ILLUSTRATED EMBODIMENTS

Figure 1:
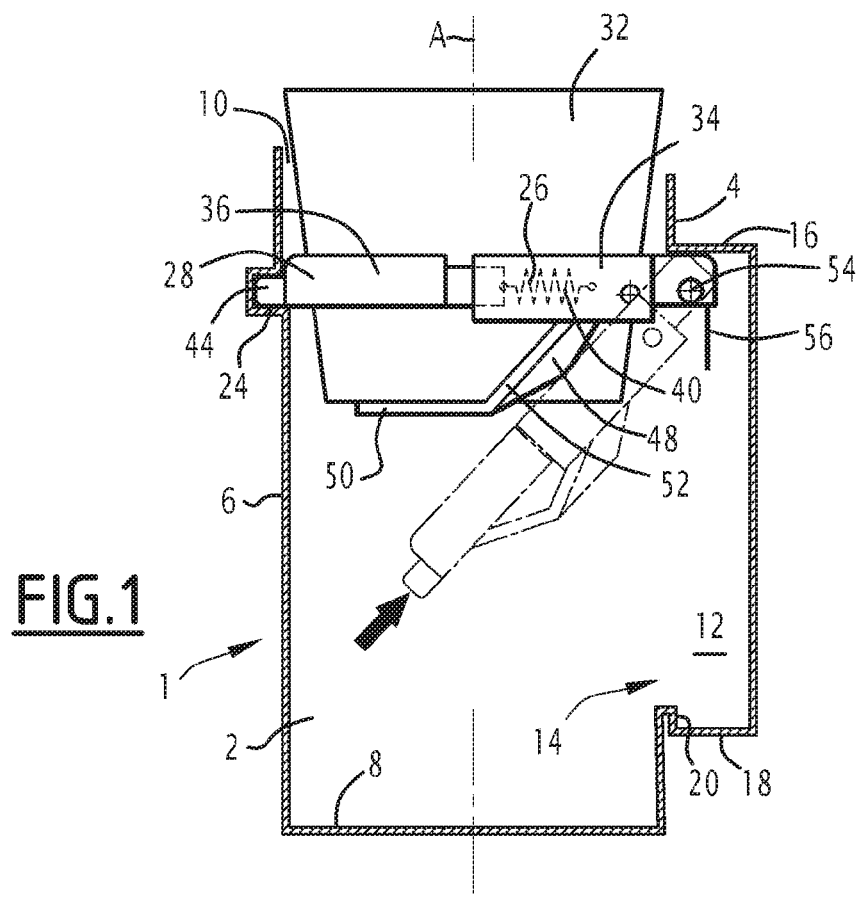
FIG. 1 is a sectional view of a storage compartment according to the invention, the holder element being in a deployed position.

According to FIG. 1, there is described a storage compartment 1 for a vehicle, for example an automotive vehicle. Such a storage compartment 1 for example forms a part of a central console of a vehicle or of a door panel or of a dashboard or of a back of a seat of another part of the interior of the vehicle.

Figure 2:
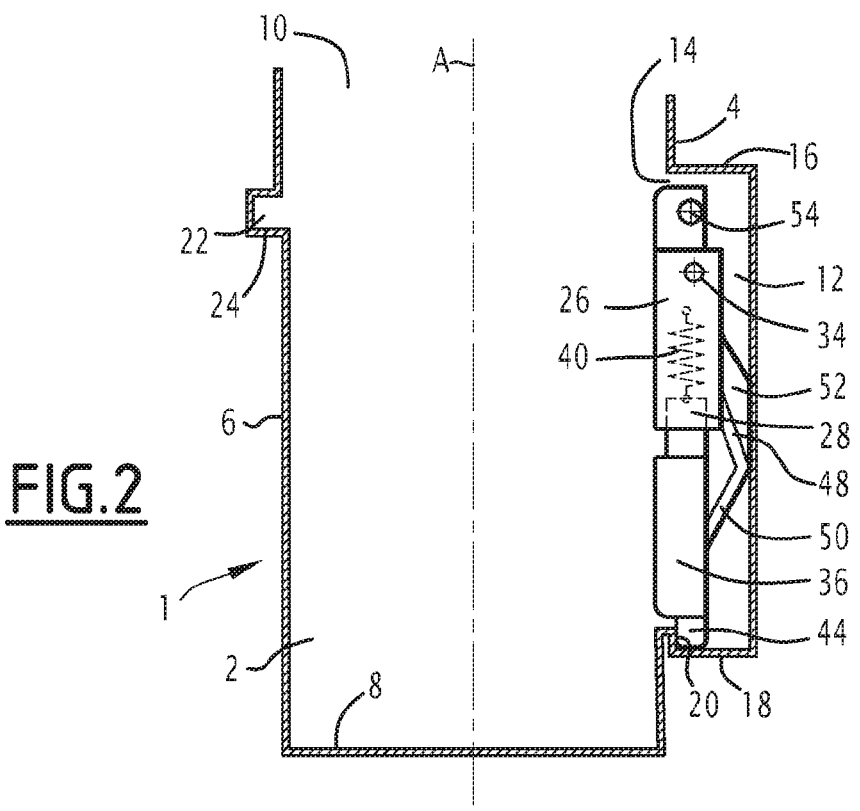
FIG. 2 is a sectional view of the storage compartment of FIG. 1, the holder element being in a retracted position.

The storage compartment 1 comprises a storage volume 2, which is sized to receive small objects, such as coins, keys, mobile phones, cards, or other small objects. The storage volume is delimited at least by a first wall 4 and a second wall 6, extending opposite the first wall 4. The storage volume 4 can further be delimited by a bottom wall 8 and by side walls (not shown) joining the first wall 4 and the second wall 6. The storage volume 2 comprises an upper opening 10 extending between the upper ends of the first wall 4 and of the second wall 6 opposite the bottom wall 8, as shown in FIGS. 1 and 2. The upper opening 10 gives access to the storage volume 2 for placing and retrieving objects in and from the storage volume 2.

The storage volume extends generally along the axis A of the upper opening, i.e. a central axis perpendicular to the plane in which the upper opening 10 extends. Axis A is for example a vertical axis when the storage compartment is installed in a vehicle.

The first wall 4 comprises a recess 12. The recess 12 extends beside the storage volume 2 and opens towards said storage volume 2 via an aperture 14 extending in a plane substantially parallel to axis A, i.e. in a plane substantially perpendicular to the plane of the upper opening 10. The recess 12 comprises an upper wall 16, extending substantially parallel to and in the vicinity of the upper opening 10, and a lower wall 18, extending opposite the upper wall 16 in the vicinity of the bottom wall 8. A locking surface 20 extends between the aperture 14 and the lower wall 18. The locking surface 20 is substantially parallel to the aperture 14 and perpendicular to the lower wall 18 and extends, as the whole recess, outside the storage volume 2.

The second wall 6 comprises a housing 22 extending beside the storage volume 2 and communicating with the storage volume 2. The housing 22 extends opposite the upper wall 16 of the recess 12. More particularly, the housing 22 comprises a locking surface 24, which forms one of the walls of the housing 22 and which extends opposite the upper part of the recess 12. This means that the locking surface 24 is substantially parallel to the upper opening 10 and extends in the vicinity of said upper opening 10.

The storage compartment 1 comprises a holder element 26, for example a cup holder according to the embodiment shown in the figures.

Figure 3:
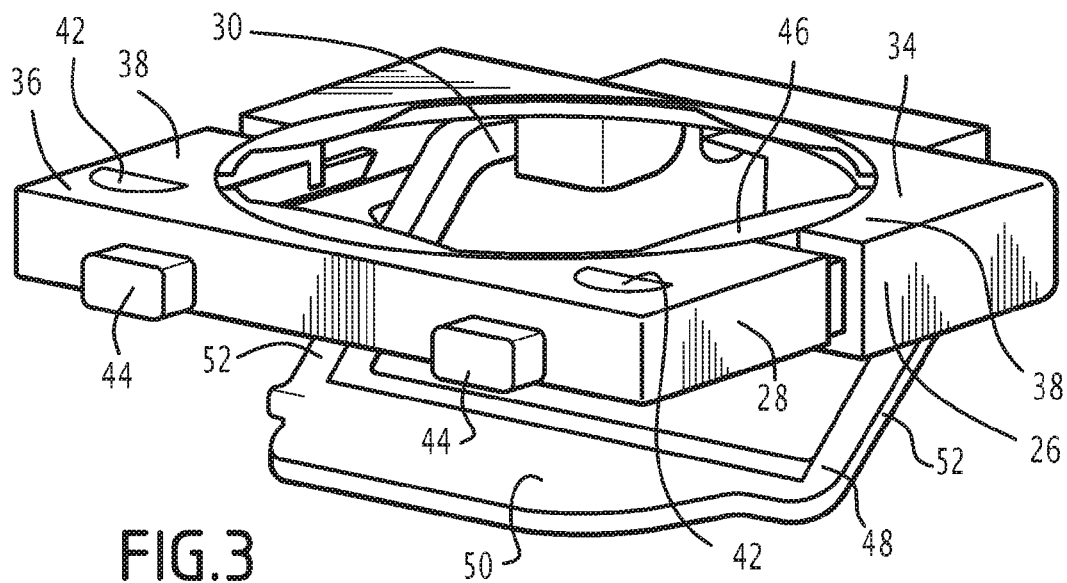
FIG. 3 is a view in perspective of the holder element of the storage element according to the invention.
Figure 4:
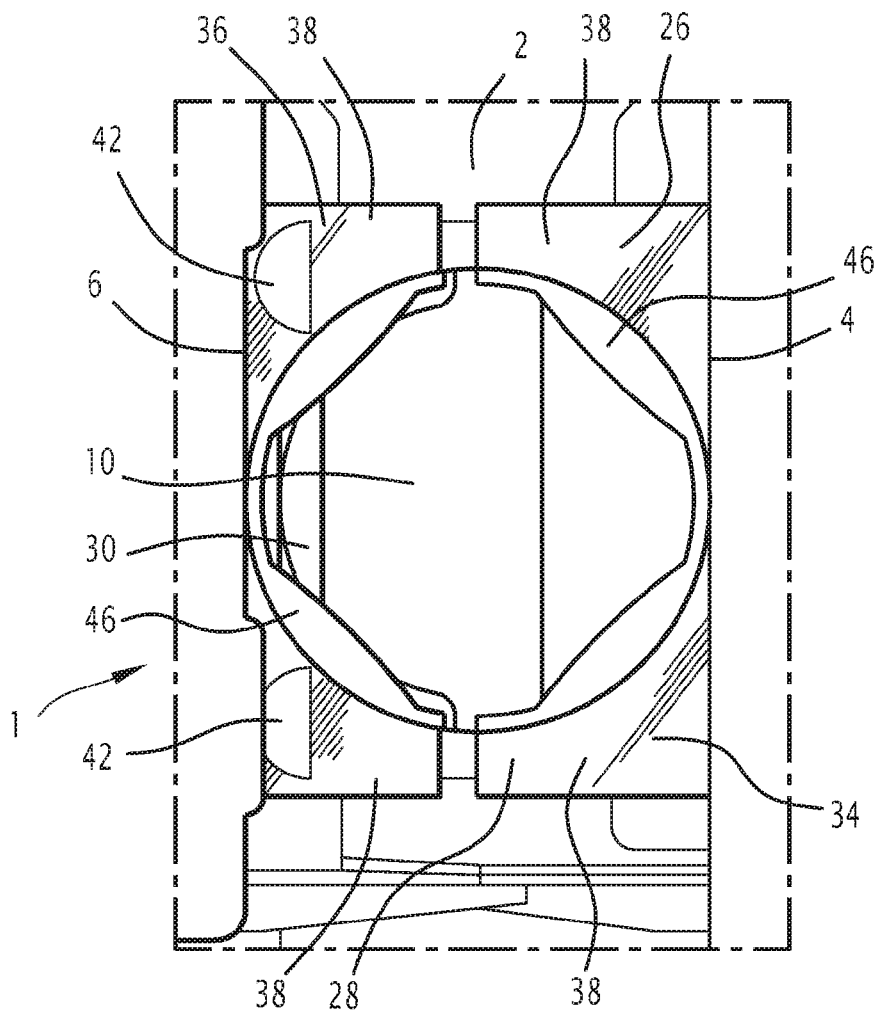
FIG. 4 is a view from above of the storage compartment of the invention, the holder element being in a deployed position.

The holder element 26 comprises a frame 28 defining an opening 30, more particularly visible in FIGS. 3 and 4, for receiving an object, such as a cup 32, as shown in FIG. 1. To this end, the opening 30 for example has a circular shape. The frame 28 is, for example, sized such that the opening 30 has a diameter which is substantially equal to the distance between the first wall 4 and the second wall 6 in the vicinity of the upper opening 10, as shown in FIG. 3.

The frame 28 is formed of a first part 34 and of a second part 36, assembled together. The first part 34 and the second part 36 define together the opening 30, which means that each one of the first part 34 and of the second part 36 defines a part of the edge of the opening 30 and that, when the first part 34 and the second part 36 are assembled, the opening 30 extends between said parts and its edge is formed by the assembly of the first part 34 and of the second part 36. To this end, the first part 34 and the second part 36 for example have each the shape of a fork having two arms 38 separated by a semi-circular space, the ends of the arms 38 of the first and second parts being attached together such that the two semi-circular spaces form together the opening 30, as can be best seen in FIG. 3. The ends of the arms 38 of one of the first and second parts are for example shaped to house the ends of the arms 38 of the other part such that the assembly of the first part 34 and of the second part 38 is obtained by introducing the ends of the arms 38 of one of the first and second parts in the ends of the arms 38 of the other part. In the embodiment shown in the figures, the ends of the arms 38 of the second part 36 are introduced in the ends of the arms 38 of the first part 34.

The first part 34 and the second part 36 are movable relative to each other between a locked position, shown in the figures, wherein the opening 30 has its maximal dimension, and a unlocked position, shown in doted lines in FIGS. 1 and 2, wherein the opening 30 has a reduced dimension, meaning that the frame 28 is retracted in the unlocked position. According to the embodiments shown in the figures, moving the frame 28 in the unlocked position is performed by sliding the ends of the arms 38 of the second part 34 inside the ends of the arms 38 of the first part 32.

A resilient element 40, shown schematically in FIGS. 1 and 2, is provided between the first part 32 and the second part 34 and is arranged to urge the frame 28 towards the locked position. This means that without any solicitation the frame 28 is in the locked position and that moving the frame 28 to the unlocked position is performed against the force applied by the resilient element 40. The resilient element 40 is for example formed by one or two springs placed between the ends of the arms 38 of the first and second parts. To manually actuate the movement of the frame 28 between the locked and the unlocked positions, the second part 36 comprises at least one actuator surface 42. The actuator surface 42 is for example formed by a recess in the second part 36 of the frame 28, said recess having for example the shape of the end of a finger of a user. According to the embodiment shown in the figures, the second part 36 comprises two actuator surfaces 42 arranged on each arm 38 of the second part 36, as shown in FIGS. 3 and 4.

The frame 28 further comprises a locking element 44 arranged to cooperate with the locking surfaces 20 and 24 of the first and second walls, as will be described subsequently. The locking element 44 is for example formed by a tab protruding from the second part 36 of the frame 28 in a direction extending in the plane of the opening 30. The tab extends on a wall of the second part 36 opposite to the wall defining the edge of the opening 30, as shown in FIG. 4. According to the embodiment shown in FIG. 4, the locking element 44 comprises two tabs spaced apart along the second part 36. The locking element 44 forms an abutment surface substantially complementary to the locking surfaces 20 and 24 of the first and second walls, as will be described subsequently.

According to an embodiment, the frame 28 comprises a flexible membrane 46 surrounding at least in part the opening 30 in order to locally reduce the diameter of the opening 30 as best seen in FIG. 3. The flexible membrane 46 forms a resilient element which can be used to apply a maintaining force against the object to be held by the holder element. Furthermore, the flexible membrane 46 allows the holder element 26 to hold objects of various sizes since the size of the opening 30 can be varied by acting on the flexible membrane 46, which is able to be compressed to enlarge the size of the opening 30. According to the embodiment shown in FIGS. 3 and 4, two flexible membranes 46 are provided and attached respectively to the first part 34 and second part 36.

According to an embodiment, the holder element 26 further comprises a support part 48 attached in an articulated manner to the frame 28. The support part 48 comprises a support surface 50 arranged to receive the bottom of an object to be held by the holder element 26, as shown in FIG. 1. The support surface 50 is attached to the frame 28 for example by two arms 52 extending on either side of the support surface 50 and attached in an articulated manner to the first part 34 of the frame 28. The articulation of the support part 48 to the frame 28 allows said support part 48 to be movable relative to the frame 28 between a retracted position (FIG. 2), wherein the support surface 50 is applied, at least in part, against the frame 28, and a deployed position (FIGS. 1 and 4), wherein the support surface 50 extends away from the opening 30 such that the support surface 50 is parallel to the opening 30 and can support the bottom of an object extending through the opening 30, as shown in FIG. 2. Consequently, as visible in FIG. 2, in the retracted position, the holder element 26 is compact and occupies a reduced space, whereas in the deployed position, the holder element 26 is able to receive and hold an object 32, such as a cup, a bottle, a can or other kinds of objects.

The holder element 26 is attached to the first wall 4 in an articulated manner so as to be movable relative to the first wall 4 between a retracted position (FIG. 2), wherein the holder element 26 is located in the recess 12 and does not extend in the storage volume 2, and a deployed position (FIGS. 1 and 3), wherein the holder element 26 extends in the storage volume 2 and is able to hold and maintain an object. More particularly, the first part 34 is articulated on a lateral wall of the recess 12 around a rotation axis 54 placed in the vicinity of the upper wall 16 of the recess 12, such that the second part 36 extends towards the lower wall 18 of the recess 12 in the retracted position of the holder element 26 and towards the second wall 6 in the deployed position of the holder element 26.

In the retracted position, the holder element 26 is completely housed in the recess 12, which means that no part of the storage volume 2 is occupied by the holder element 26. The volume of the recess 12 is arranged to completely receive the holder element 26 in the retracted position, knowing that the support part 48 is also in the retracted position, which means that the volume of the recess 12 can be reduced.

Furthermore, when the holder element 26 is in the retracted position, the frame 28 is urged towards the locked position such that the locking element 44 is placed in abutment against the locking surface 20 of the recess 12. Consequently, the holder element 26 is locked in the retracted position as long as the frame 28 is not actuated towards the unlocked position. The recess 12 and its locking surface 20 are sized such that when the holder element 26 is actuated in its unlocked position, the locking element 44 can be disengaged from the locking surface 20 of the recess 12 such that the holder element 26 can move towards its deployed position.

A resilient element 56 is advantageously arranged around the rotation axis 54 of the holder element 26 to urge the holder element 26 towards the deployed position. This means that, once a user has actuated the frame 28 in the unlocked position to disengage the locking element 44 from the locking surface 20 by pulling on the second part 36 towards the first part 34, the holder element 26 can move automatically to the deployed position.

When the holder element 26 reaches the deployed position, the locking element 44 is automatically engaged in the housing 22 thanks to the resilient element 40 such that the frame 28 reaches its locked position. During the movement of the holder element 26, the support part 48 moves to its deployed position under the action of gravity.

In the deployed position, the locking element 44 cooperates with the locking surface 24 of the housing 22 and is prevented to move towards the retracted position without any actuation from a user to move the frame 28 towards its unlocked position. In particular, the tab forming the locking element 44 presents a shape which is substantially complementary to the shape of the housing 22. When several tabs are provided, the second wall 6 for example comprises as many housings 22 or a single housing arranged to receive all the tabs in the deployed position.

The housing 22 is placed on the second wall 6 such that, in the deployed position, the opening 30 of the frame 28 explains in a plane which is substantially perpendicular to the axis A of the storage compartment 1, which means that the opening 30 is substantially parallel to the upper opening 10. Consequently, when the axis A is vertical, the opening 30 and the support surface 50 extend substantially horizontally as shown in FIG. 1.

In the deployed position, the opening 30 of the frame 28 extends across the storage volume 2 and is adjacent or spaced from the upper opening 10. When the opening 30 of the frame 28 is spaced from the upper opening 10, the parts of the first and second walls extending between the opening 30 of the frame 28 and the upper opening 10 can be used to maintain the object 32 placed in the holder element 26 in an upright position.

To move the holder element 26 back to its retracted position, the user actuates the frame towards the unlocked position using the actuating surface(s) 42 and pushes on the frame 28 such that the frame 28 rotates relative to the first wall 4 around the rotation axis 54 towards the recess 12. Once the holder element 26 reaches the recess 12, the support 48 is moved towards its retracted position by the bottom wall of the recess. Once the holder element 26 is placed in the recess 12, the user releases the frame 28 which moves towards the locked position, wherein the locking element 44 cooperates with the locking surface 20.

The above described storage compartment 1, comprising a foldable holder element, allows completely hiding the holder element 26 in the recess 12, where the holder element 26 does not impede the capacity of the storage compartment 1 and is practically invisible from outside the storage volume 2, since the holder element 26 does not extend in the storage volume 2. Furthermore, in the deployed position, the holder element 26 is "flush" with the storage volume 2, which means that the opening 30 extends on the whole section of the storage volume, as shown in FIG. 3. This increases the robustness of the holder element 26 in the deployed position since the frame 28 is maintained in the deployed position both by the first and second walls. Such a maintaining is advantageous over the holder elements of the prior art which often "hang" from a part of the interior of the vehicle, without being supported on two sides of the opening. Furthermore, the appearance of the holder element 26 is satisfactory.

The invention claimed is:

1. A storage compartment for a vehicle comprising a storage volume delimited by at least a first wall and a second wall extending opposite the first wall, said first wall comprising a recess opening towards the storage volume, the storage compartment comprising a holder element comprising a frame, delimiting an opening for the reception of an object to be held by the holder element, and a locking element, said holder element being articulated on the first wall, wherein the holder element is movable in rotation between a retracted position, wherein the frame extends in the recess of the first wall and does not extend in the storage volume, and a deployed position, wherein the frame extends in the storage volume and the locking element cooperates with a locking surface of the second wall such that the opening of the holder element extends across the storage volume.

2. The storage compartment according to claim 1, wherein the locking element cooperates with a locking surface of the recess such that the holder element is maintained in the recess in the retracted position.

3. The storage compartment according to claim 1, wherein the frame comprises a first part and a second part, said first part and second part defining together the opening, the first part being articulated on the first wall and the second part carrying the locking element, the first part and the second part being movable relative to each other between a locked position, wherein the locking element cooperates with a locking surface of the first wall or of the second wall, and an unlocked position, wherein the locking element can be disengaged from the locking surface of the first wall or of the second wall such that the holder element can move between its retracted position and its deployed position.

4. The storage compartment according to claim 3, wherein at least one resilient element extends between the first part and the second part, said resilient element being arranged to urge the second part towards the locked position.

5. The storage compartment according to claim 4, wherein the frame comprises at least one actuator surface, said actuator surface being actuable to move the second part towards the unlocked position against the force of the resilient element.

6. The storage compartment according to claim 1, wherein at least one resilient element is arranged around an axis of rotation of the holder element to urge the holder element towards its deployed position.

7. The storage compartment according to claim 1, wherein the holder element further comprises a support part, comprising a support surface, said support part being movable relative to the frame of the holder element between a retracted position, wherein at least a part of the support surface is applied against the frame when the holder element is in the retracted position, and a deployed position, wherein the support surface extends away from the opening such that the support surface is substantially parallel to the opening when the holder element is in the deployed position.

8. The storage compartment according to claim 1, wherein at least one flexible membrane is attached to the frame such that said flexible membrane surrounds a part of the opening to locally reduce the diameter of said opening.

9. The storage compartment according to claim 1, wherein, in the deployed position, the opening extends in a plane substantially perpendicular to an axis of the storage volume.

10. The storage compartment according to claim 1, wherein the locking element is formed by at least one tab protruding from the frame.

11. The storage compartment according to claim 1, wherein the storage compartment forms a part of a central console of a vehicle.

* * * * *